United States Patent [19]

Sutherland

[11] Patent Number: 4,672,226

[45] Date of Patent: Jun. 9, 1987

[54] REDUNDANT RESISTANCE TEMPERATURE DETECTOR POWER SUPPLY SYSTEM

[75] Inventor: James F. Sutherland, Plum Boro, Pa.

[73] Assignee: Westinghouse Electric Corp., Pittsburgh, Pa.

[21] Appl. No.: 709,753

[22] Filed: Mar. 8, 1985

[51] Int. Cl.[4] .......... H02J 1/00

[52] U.S. Cl. .......... 307/43; 307/64; 307/66; 307/85; 361/91; 323/269; 363/69

[58] Field of Search .......... 307/43, 51, 52, 60, 307/62, 65, 64, 59, 66, 71, 86, 85, 87; 323/369, 269; 363/69, 70; 361/6, 7, 88, 90, 91, 92; 219/501, 505

[56] References Cited

U.S. PATENT DOCUMENTS

| | | | |
|---|---|---|---|
| 3,418,486 | 12/1968 | Shinskey | 307/62 |
| 3,428,820 | 2/1969 | Lyon | 307/64 |
| 3,551,746 | 12/1970 | Rubner | 361/86 X |
| 3,601,659 | 8/1971 | Tanaka | 307/85 X |
| 3,652,866 | 3/1972 | Moakler et al. | 307/64 X |
| 3,654,537 | 4/1972 | Coffey | 307/83 X |
| 3,699,352 | 10/1972 | Silver | 307/43 X |
| 3,723,855 | 3/1973 | Shuleshko | 307/85 X |
| 3,808,452 | 4/1974 | Hutchinson | 307/64 |
| 3,912,940 | 10/1975 | Vince | 307/86 X |
| 3,946,375 | 3/1976 | Bishop et al. | 307/51 X |
| 4,004,155 | 1/1977 | Nercessian | 307/52 |
| 4,035,716 | 7/1977 | Hutchinson | 307/64 X |
| 4,091,432 | 5/1978 | Muller | 361/91 X |
| 4,194,147 | 3/1980 | Payne et al. | 307/53 X |
| 4,230,981 | 10/1980 | Rambold | 307/82 X |
| 4,262,214 | 4/1981 | Patel | 361/6 X |
| 4,356,403 | 10/1982 | Mohat | 307/60 |
| 4,426,587 | 1/1984 | Nouet | 307/66 |
| 4,564,767 | 1/1986 | Charyeh | 307/87 |

OTHER PUBLICATIONS

Fast Over/Under Voltage Protection by Design Electronic, vol. 8, No. 4 (Jan 1971).

*Primary Examiner*—William M. Shoop, Jr.
*Assistant Examiner*—Shik Luen Paul Ip
*Attorney, Agent, or Firm*—R. S. Lombard

[57] ABSTRACT

A redundant power supply/signal conditioner system for a resistance temperature detector includes power supply/signal conditioner modules having first and second output terminals connected to a resistance temperature detector. Diode circuits are connected across the output terminals of each of the power supply/signal conditioner modules to provide an alternate current path when the corresponding power supply/signal conditioner module is removed or is not conductive due to a failure. Each of the power supply/conditioner modules includes a constant current source for supplying a constant current which is slightly different in each of the modules. Each of the modules also includes an overvoltage protection circuit for preventing the voltage output by the constant current source from exceeding a predetermined value and a signal conditioner which outputs a signal based on the temperature detected by the resistance temperature detector. The resistance temperature detector is operated by a current from the module containing the constant current source which generates the highest current and all other constant current sources are controlled by a voltage across a feedback resistor to stay turned off as long as the current is supplied. When the current stops being supplied because the operating constant current source fails or is removed, the next highest voltage current source is turned on due to the drop in current across its feedback resistor and begins supplying current to the resistance temperature detector.

12 Claims, 7 Drawing Figures

REDUNDANT RESISTANCE TEMPERATURE DETECTOR POWER SUPPLY SYSTEM

BACKGROUND OF THE INVENTION

1. Field of the Invention

The present invention relates in general to power supply/signal conditioning modules used in connection with a resistance temperature detector (RTD); and more particularly, to a system having redundant power supply/signal conditioning modules used in combination with a single resistance temperature detector in a pressurized light water nuclear power system.

2. Description of the Related Art

A conventional power supply/signal conditioner module 10 for a resistance temperature detector (RTD) 12 is illustrated in FIG. 1. The power supplied by the module 10 is produced by a constant current source 14 connected to a ±15 volt power source, not shown. Since surge withstand testing is commonly performed in the control systems of nuclear power systems, a surge withstand circuit 16 is provided across the output terminals 18 and 20 of the power supply portion of module 10. A similar surge withstand circuit 22 is provided across input terminals 24 and 26 to provide protection for an input signal conditioner 28.

The conventional constant current source 14 includes a precision reference 30, such as an AD2710H manufactured by Analog Devices, which provides a constant voltage of, for example, 10.0 volts when connected to a +15 volt power supply and ground. Resistors 32 and 36 act as a voltage divider to produce a control voltage $V_1$. An operational amplifier 38 receives the voltage $V_1$ and a voltage $V_2$, generated by current through a feedback resistor 40 connected between the second output terminal 20 and ground. The operational amplifier 38 is powered by the ±15 volt power supply and outputs a constant current to the RTD 12 via the surge withstand circuit 16 and the first output terminal 18. The constant current returns from the RTD 12 via the second output terminal 20 and surge withstand circuit 16 to flow through the feedback resistor 40, causing the voltage drop $V_2$ by which the operational amplifier 38 is controlled.

The surge withstand circuits 16 and 22, as described above, are commonly used in control systems for nuclear power systems, but are not required by power supply/signal conditioner modules for resistance temperature detectors when surge withstand tests are not performed. An example of the surge withstand circuit 16 for the conventional power supply portion of module 10 is illustrated in FIG. 2. The circuit in FIG. 2 includes capacitors 42, 44, 46 and 48 connected across the output terminals 18 and 20. A resistor 50 and 52 is connected to each of the output terminals 18 and 20 and a fuse 54 is connected to one of the resistors, in this case resistor 50. A bipolar zener diode 56 is connected in parallel with capacitor 48. The bipolar zener diode 56 may be a Tranzorb diode manufactured by General Semiconductor Industries, Inc. The capacitors 42–48, in the surge withstand circuit 16, are typically 0.1 μF capacitors except for capacitor 48 which is a 1 μF capacitor.

After emerging from the surge withstand circuit 16, the constant current output from the operational amplifier 38 passes through the first output terminal 18, through the RTD 12 and back to the output terminal 20, causing a voltage drop $V_3$ across the RTD 12. The voltage drop $V_3$ across the RTD 12 is sensed by the input signal conditioner 28 and varies depending on the temperature of the resistor comprising the RTD 12. A typical resistance temperature detector 12 can be obtained from RdF Corporation and pressurized light water nuclear power systems typically use model number 21204. The input signal conditioner 28 as illustrated in FIG. 3 comprises an input buffer 58 and a filter 60. The input buffer 58 and filter 60 each comprise operational amplifiers 62, resistors 64 and capacitors 66.

The power supply and signal conditioner described above are usually provided as a single module which may be disconnected at cable connectors 68 (FIG. 1) for repair or replacement. However, when the module 10 is disconnected, there is no longer either a power supply or an input signal conditioner 28 connected to the RTD 12. It is possible to provide redundant input signal conditioners by simply connecting the input terminals 24 and 26 of multiple modules 10 in parallel, however there is no known system which provides redundant power supplies.

SUMMARY OF THE INVENTION

An object of the present invention is to provide a redundant power supply/signal conditioner system for a resistance temperature detector.

Another object of the present invention is to provide power supply/signal conditioner modules which can be used in a redundant power supply/signal conditioner system for a resistance temperature detector.

An additional object of the present invention is to provide a power supply which can be connected in series with other power supplies and which supplies power only when a power failure is sensed in the series circuit.

Still another object of the present invention is to provide a redundant power supply/signal conditioner system for a resistance temperature detector in which only one power supply outputs current at any one time.

A further object of the present invention is to provide a power supply/signal conditioner system in which a power supply/signal conditioner module can be removed for testing or maintenance and another power supply/signal conditioner module will automatically take over the function of detecting temperature via a resistance temperature detector connected to the power supply/signal conditioner system.

Yet another object of the present invention is to provide a power supply for a resistance temperature detector which provides protection against voltages higher than the power supply is designed to output.

The above-mentioned objects can be attained by providing a redundant power supply/signal conditioner system for a resistance temperature detector comprising power supply/signal conditioner modules having output terminals and diode means connected across the output terminals of each of the power supply/signal conditioner modules. Each of the power supply/signal conditioner modules includes signal conditioner means for generating an output signal indicating a temperature detected by the resistance temperature detector, constant current source means for supplying a constant current with an output voltage at a current output to the resistance temperature detector via the output terminals, and overvoltage protection means for preventing the output voltage from exceeding a predetermined voltage. Each of the power supply/signal conditioner modules also includes a first diode connected between the output of the constant current source means and the first output terminal and a second diode connected between ground and the first output terminal.

These objects, together with other objects and advantages which will be subsequently apparent, reside in the details of the construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 4:
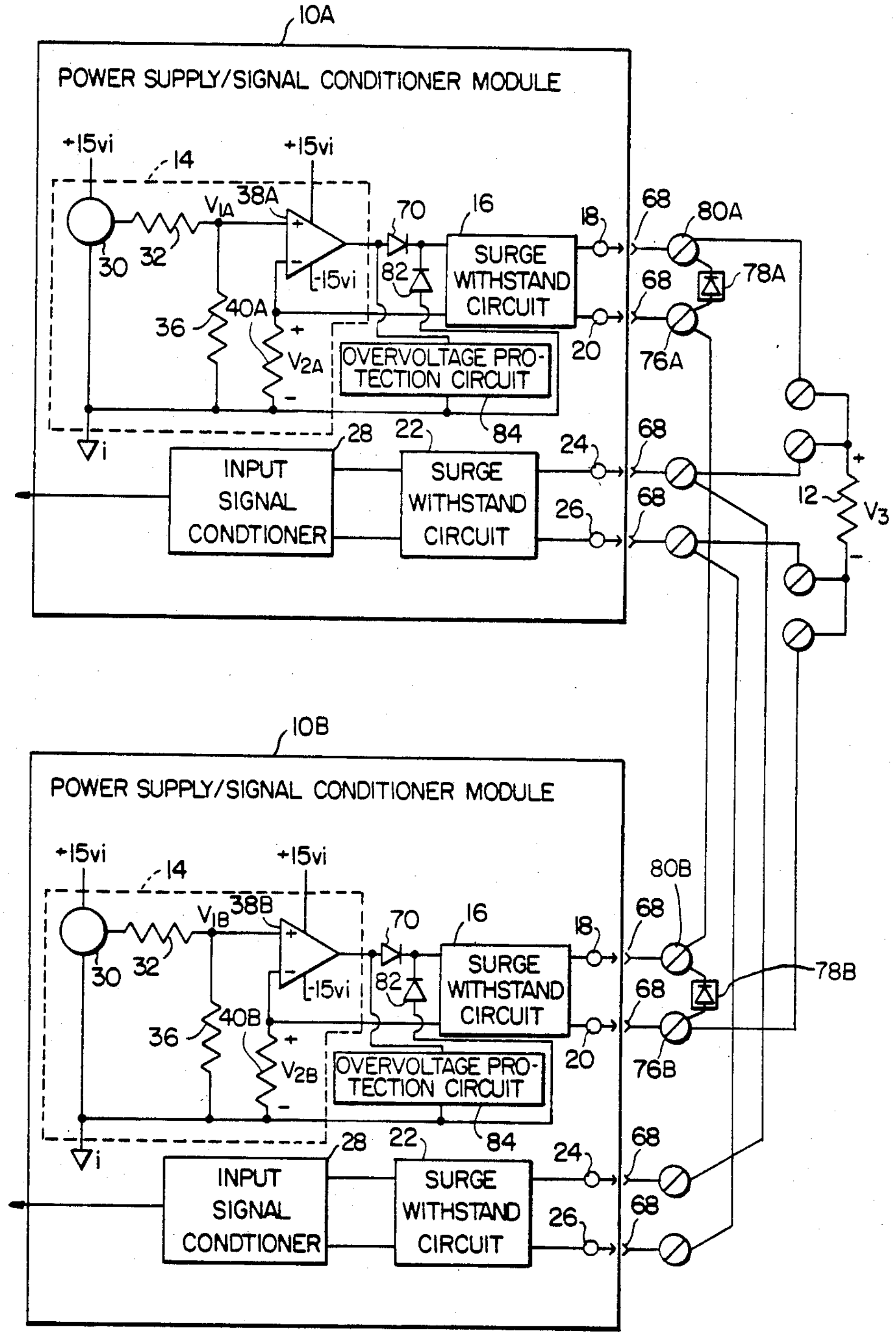
FIG. 4 is a block circuit diagram of a power supply/input signal conditioner system according to the present invention.

According to the present invention, multiple power supply/signal conditioner modules 10 are connected in series as illustrated in FIG. 4. Each of the constant current sources 14 in the modules 10 in a system according to the present invention is designed to output a slightly different current with a difference of approximately one-tenth of one percent between the voltage $V_1$ supplied by the precision reference 30 and resistors 32 and 36. Assuming that the voltage $V_{1A}$ is slightly greater than the voltage $V_{1B}$, while the voltage $V_{2A}$ and $V_{2B}$ are equal, operational amplifier 38A in module 10A will be driven positive while the operational amplifier 38B in module 10B will be driven negative. Thus, a current will flow through diode 70 to the output terminal 18 of module 10A, while the diode 70 in module 10B will block the flow of current to the operational amplifier 38B.

The current from the first output terminal 18 of module 10A flows through the RTD 12, causing a voltage drop $V_3$ which can be sensed by the signal conditioners 28 in modules 10A and 10B. After flowing through the RTD 12, the current reaches screw terminal 76B. A diode circuit 78B between screw terminals 76B and 80B has a bias voltage from screw terminal 76B to 80B, i.e., from the second output terminal 20 to the first output terminal 18 of module 10B, which is higher than that caused by the current flowing through the surge withstand circuit 16, resistor 40B and diode 82 in module 10B. Therefore, the current flows through module 10B rather than through diode 78B and returns to the resistor 40A in the constant current source 14 in module 10A after passing through the surge withstand circuit 16.

The redundant power supply/signal conditioner system illustrated in FIG. 4 is capable of surviving any single failure. If the constant current source 14 "fails high" by outputting a voltage higher than is allowed for by the system, an overvoltage protection circuit 84 grounds the output of the operational amplifier 38, as will be explained later with respect to FIG. 5. Therefore, if the constant current source 14 in module 10A, which is again assumed to output the highest voltage, "fails high", "fails low", or is removed from the system, the result is the same—a current is no longer supplied to the system by the constant current source 14 in module 10A. When this occurs, the voltage $V_{2B}$ drops below that of voltage $V_{1B}$ and the operational amplifier 38 in module 10B is turned on, producing a voltage within 0.1% of that previously produced by the constant current source 14 in module 10A.

Figure 1:
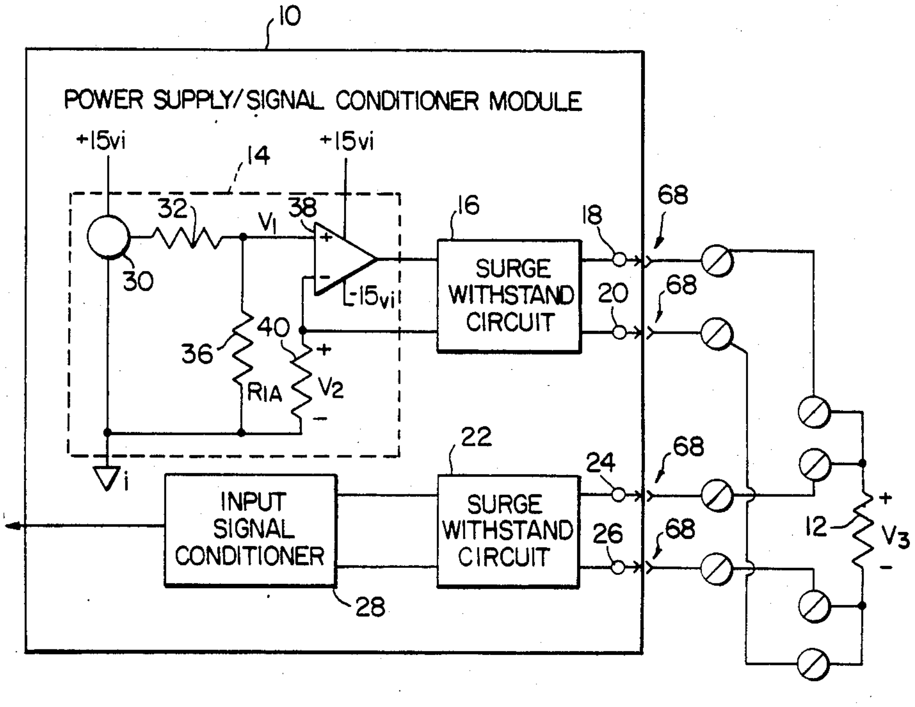
FIG. 1. PRIOR ART
FIG. 1 is a block circuit diagram of a conventional power supply 10, resistance temperature detector 12 and signal conditioner 28.
Figure 2:
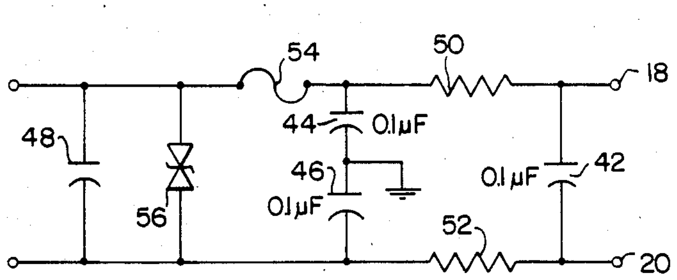
FIG. 2. PRIOR ART
FIG. 2 is a circuit diagram of the conventional surge withstand circuit 16 of FIG. 1 in a resistance temperature detector system.
Figure 3:
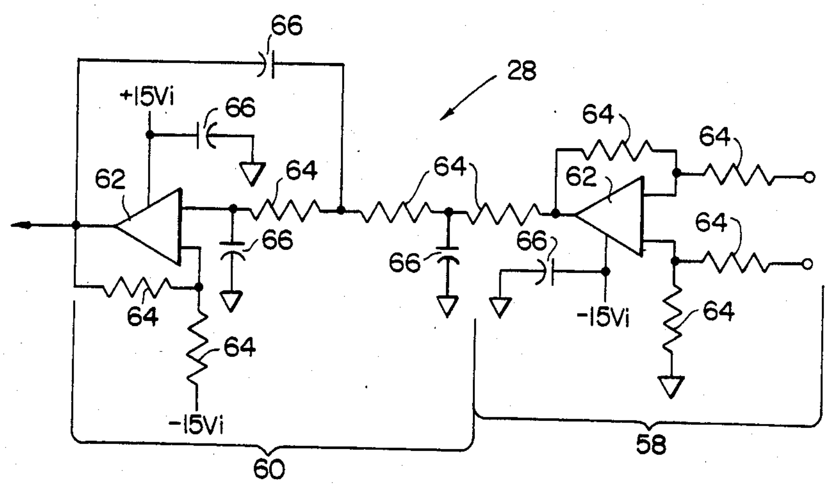
FIG. 3. PRIOR ART
FIG. 3 is a circuit diagram of the conventional signal conditioner 28 of FIG. 1 for a resistance temperature detector.
Figure 5:
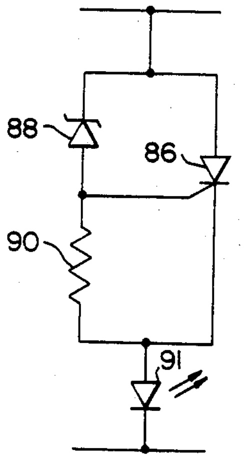
FIG. 5 is a circuit diagram of an overvoltage protection circuit 84 of FIG. 4.

These results are easily provided by using an overvoltage protection circuit such as an MPC2005 manufactured by Motorola Inc. or a circuit such as that illustrated in FIG. 5 using a silicon controlled rectifier 86 controlled by zener diode 88 connected in series with a resistor 90. Very little current flows through the circuit illustrated in FIG. 5 until the voltage output by the constant current source 14 is sufficiently high to break down the zener diode 88. When the breakdown occurs, a positive voltage is applied to the gate electrode of the silicon controlled rectifier 86 which then turns on and remains on, routing all current supplied by the current limited operational amplifier 38 through an LED 91 which provides a visual indication of a "high" failure. Conventional silicon controlled rectifiers are turned off by stopping the current flowing therethrough, therefore if the cause of the excessively high voltage is corrected, there must be a break in the current in order for the silicon controlled rectifier 86 to permit the constant current source 14 to again supply current to the RTD 12.

A failed power supply/signal conditioner module 10 can be removed from the system without affecting the operation of the remaining components. Assuming the above described failure to produce a current in module 10A has occurred and module 10A is removed for repair or replacement, the current output by the constant current source 14 in module 10B will continue to be supplied to the RTD 12. The current will flow from the first output terminal 18 (FIG. 4) in module 10B to the screw terminal 76A, and since the usual current path through module 10A is not available, the current will flow through diode 78A to screw terminal 80A and return to module 10B via the RTD 12.

Figure 6A:
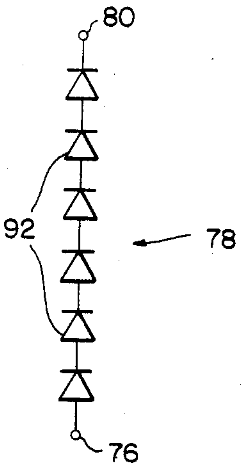
FIGS. 6A and 6B are circuit diagrams of diode circuits 78A/B of FIG. 4.
Figure 6B:
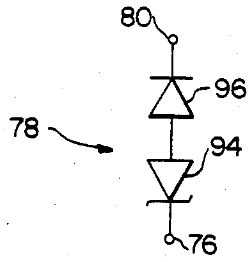

In order to provide the operation described above, the diode circuits 78A and 78B must have a bias voltage from screw terminals 76 to 80 which is higher than that caused by the current flowing through a nonoperational power supply module 10. Conventional constant current source 14 and surge withstand circuit 16 combined with diode 72 will cause a voltage drop of approximately 3.0 volts across output terminals 20 and 18. Thus, as illustrated in FIG. 6A, each of the diode circuits 78 may comprise a group of series connected diodes 92 with a total forward bias voltage drop of greater than 3.0 volts. Alternatively, as illustrated in FIG. 6B, each of the diode circuits 78 may comprise a high power, reverse bias diode 94, such as a Tranzorb diode and a forward bias diode 96, having a combined breakdown voltage higher than 3.0 volts.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A power supply for a resistance temperature detector, comprising:

constant current source means, operatively connectable to the resistance temperature detector, for supplying a constant current with an output voltage at a current output;

overvoltage protection means, operatively connected to the current output of said constant current source means and ground, for grounding the current output if the output voltage exceeds a predetermined voltage;

a first diode operatively connected to the current output of said constant current source means and operatively connectable to the resistance temperature detector for permitting the constant current to flow continually therethrough while said power supply is active; and a second diode operatively connected to ground and operatively connectable to the resistance temperature detector for providing a current path when said power supply is inactive.

2. A power supply as recited in claim 1, wherein said first diode has an anode operatively connected to the current output of said constant current source means and a cathode operatively connected to the resistance temperature detector, wherein said second diode has an anode operatively connected to ground and a cathode operatively connected to the resistance temperature detector, and wherein said constant current source means comprises:

voltage supply means for supplying a control voltage;

an operational amplifier, operatively connected to said voltage supply means, said overvoltage protection means and the anode of said first diode; and a feedback resistor operatively connected to said operational amplifier and the anode of said second diode and operatively connectable to the resistance temperature detector, for driving said operational amplifier inactive when current flows through said second diode.

3. A power supply as recited in claim 2, further comprising a surge withstand circuit operatively connected to said first and second diodes and said feedback resistor and operatively connectable to the resistance temperature detector.

4. A power supply and signal conditioner for a resistance temperature detector, comprising:

constant current source means, operatively connectable to the resistance temperature detector, for supplying a constant current with an output voltage at a current output;

overvoltage protection means, operatively connected to the current output of said constant current source means and ground, for grounding the current output if the output voltage exceeds a predetermined voltage;

a first diode operatively connected to the current output of said constant current source means and operatively connectable to the resistance temperature detector for permitting the constant current to flow continually therethrough while said power supply is active;

a second diode operatively connected to ground and operatively connectable to the resistance temperature detector for providing a current path when said power supply is inactive; and signal conditioner means operatively connectable to the resistance temperature detector, for generating an output signal indicating a temperature detected by the resistance temperature detector.

5. A power supply and signal conditioner as recited in claim 4, wherein said first diode has an anode operatively connected to the current output of said constant current source means and a cathode operatively connected to the resistance temperature detector, wherein said second diode has an anode operatively connected to ground and a cathode operatively connected to the resistance temperature detector, and wherein said constant current source means comprises:

voltage supply means for supplying a control voltage;

an operational amplifier, operatively connected to said voltage supply means, said overvoltage protection means and the anode of said first diode; and a feedback resistor operatively connected to said operational amplifier and the anode of said second diode and operatively connectable to the resistance temperature detector.

6. A power supply and signal conditioner as recited in claim 5, further comprising:

a first surge withstand circuit operatively connected to said first and second diodes and said feedback resistor and operatively connectable to the resistance temperature detector; and a second surge withstand circuit operatively connected to said signal conditioner means and operatively connectable to the resistance temperature detector.

7. A redundant power supply and signal conditioner system for a resistance temperature detector which detects a temperature in a pressurized light water nuclear power system, comprising:

power supply modules, each of said power supply modules having first and second input terminals, the first and second output terminals of said power supply modules operatively connected in series and operatively connectable to the resistance temperature detector and the first and second input terminals of said power supply modules operatively connectable in parallel to the resistance temperature detector, each of said power supply modules comprising:

constant current source means for supplying a constant current with an output voltage at a current output;

overvoltage protection means, operatively connected to the current output of said constant current source means and ground, for grounding the current output if the output voltage exceeds a predetermined voltage;

a first diode operatively connected between the current output of said constant current source means and the first output terminal for permitting the constant current to flow continually therethrough while said power supply module containing the first diode is supplying current to the resistance temperature detector;

a second diode operatively connected between ground and the first output terminal for providing a current path when said power supply module containing the first diode is not supplying power to the resistance temperature detector resulting in an operating voltage drop across the second and first output terminals; and signal conditioner means, operatively connected to the first and second input terminals, for generating an output signal indicating the temperature detected by the resistance temperature detector; and diode means, the first and second output terminals of each of said power supply modules being operatively connected to one of said diode means, for providing a forward bias voltage drop greater than the operating voltage drop across the second and first output terminals of an inactive one of said power supply modules.

8. A redundant power supply and signal conditioner system as recited in claim 7, wherein the operating voltage drop for each of said power supply modules is different.

9. A redundant power supply and signal conditioner system as recited in claim 8, wherein said first diode in each of said power supply modules has an anode operatively connected to the current output of said constant current source means and a cathode operatively connected to the first output terminal, wherein said second diode in each of said power supply modules has an anode operatively connected to ground and a cathode operatively connected to the first output terminal, and wherein said constant current source means in each of said power supply modules comprises:

voltage supply means for supplying a control voltage;

an operational amplifier, operatively connected to said voltage supply means, said overvoltage protection means and the anode of said first diode; and a feedback resistor operatively connected to said operational amplifier, the second output terminal and the anode of said second diode.

10. A redundant power supply and signal conditioner system as recited in claim 9, wherein each of said power supply modules further comprises:

a first surge withstand circuit operatively connected to the first and second output terminals, said first and second diodes and said feedback resistor; and a second surge withstand circuit operatively connected to said signal conditioner means and the first and second input terminals.

11. A redundant power supply and signal conditioner system as recited in claim 8, wherein each of said diode means comprises series-connected diodes, operatively connected to the first and second output terminals of one of the power supply modules, each of said series-connected diodes having an anode operatively connected to the second output terminal and a cathode operatively connected to the first output terminal of the one of said power supply modules.

12. A redundant power supply and signal conditioner system as recited in claim 8, wherein each of said diode means comprises:

a third diode having a cathode operatively connected to the first output terminal of a corresponding one of said power supply modules and having an anode operatively connected to the second output terminal; and a high power, reverse bias diode, connected in series with said third diode, said high power, reverse bias diode having an anode operatively connected to the first output terminal and a cathode operatively connected to the second output terminal.

* * * * *